(No Model.)
C. P. KAHLER.
SEWER INLET.
No. 366,846. Patented July 19, 1887.
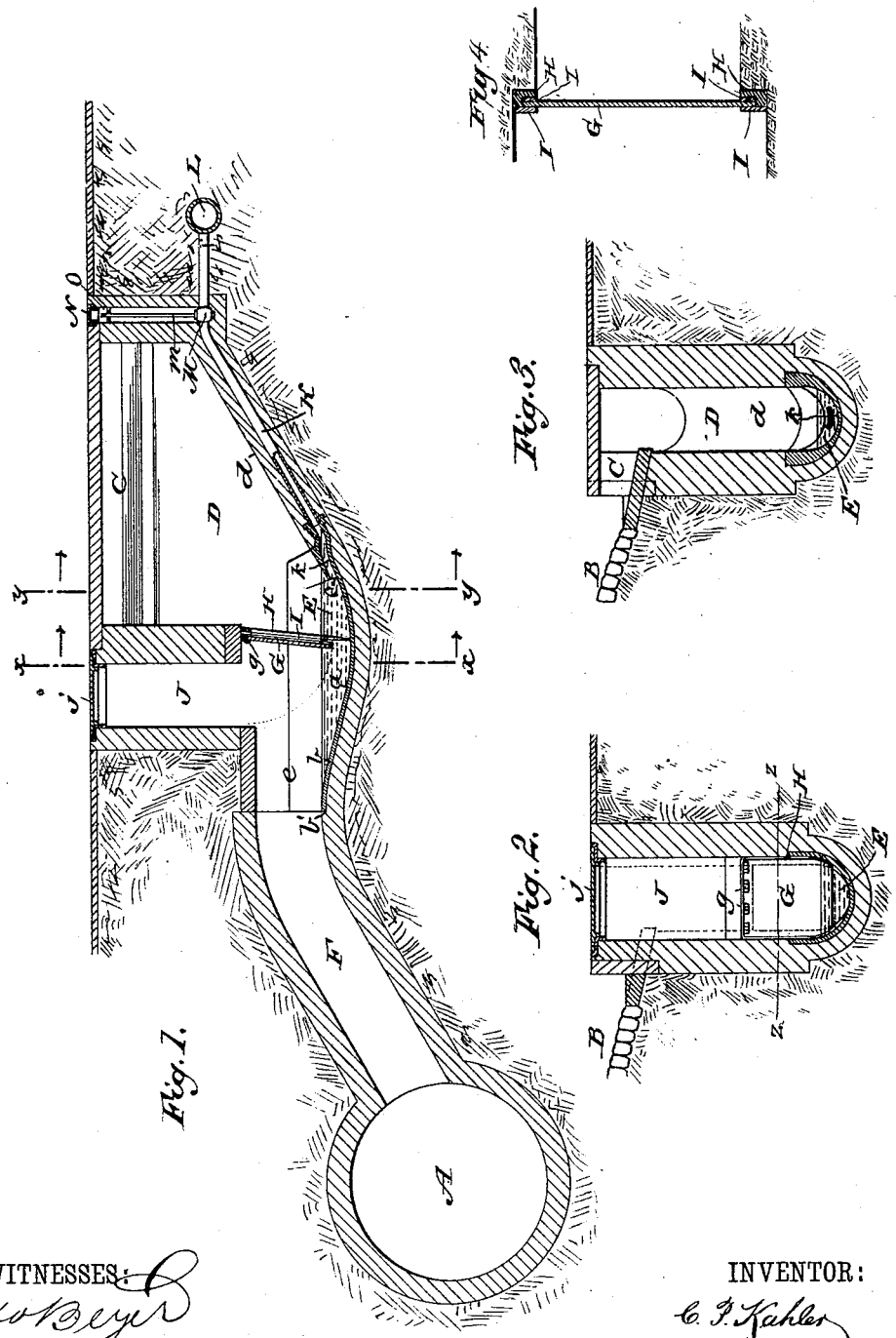
WITNESSES:
INVENTOR:
C. P. Kahler
BY Munn & Co.
ATTORNEYS.

UNITED STATES PATENT OFFICE.

CHARLES PORTERFIELD KAHLER, OF BALTIMORE, MARYLAND.

SEWER-INLET.

SPECIFICATION forming part of Letters Patent No. 366,846, dated July 19, 1887.

Application filed February 15, 1887. Serial No. 227,725. (No model.)

*To all whom it may concern:*

Be it known that I, CHARLES PORTERFIELD KAHLER, of Baltimore, in the State of Maryland, have invented a new and Improved Sewer-Inlet, of which the following is a full, clear, and exact description.

My invention relates to inlets from streets or roads to sewers for drainage purposes, and has for its object to provide a simple and effective sewer-inlet preventing escape of gases from the sewer and adapted to be automatically flushed with fresh water by simply opening a valve to assure thorough cleansing of the inlet from foul sedimentary deposits.

The invention consists in certain novel features of construction and combinations of parts of the sewer-inlet, all as hereinafter fully described and claimed.

Reference is to be had to the accompanying drawings, forming a part of this specification, in which similar letters of reference indicate corresponding parts in all the figures.

Figure 1 is a longitudinal sectional elevation of a sewer-inlet and a cross-section of the sewer and parts of the adjacent street or roadway. Fig. 2 is a vertical sectional elevation taken on the line $x$ $x$ of Fig. 1. Fig. 3 is a like view taken on the line $y$ $y$ of Fig. 1; and Fig. 4 is a section on line $z$ $z$, Fig. 2.

The sewer A may have any approved form, size, or construction, and will be built, as usual, under the street or roadway B, which drains into it through an opening, C, admitting the water to a chamber, D, down the inclined bottom $d$ of which the water flows to a basin, E, which opens at $e$ into a drain or pipe, F, connected to the sewer.

The basin E is made shallow, and the bottom thereof is curved from $c$ to $a$, and is straight and tangent to the curve from $a$ to $b$, and curved from $b$ to $b'$, as clearly shown in Fig. 1. The object of constructing the basin as above described is twofold. The first is to present a surface offering the least resistance to the outflowing water and sediment, and, secondly, affording the least space for the collection of sediment, and at the same time holding sufficient water to form, with the gate G, a perfect seat.

A trap, gate, or valve, G, is hinged at $g$, above the top of the outlet $e$, to swing in the direction of the sewer, to allow the free passage of the maximum quantity of water which can under any conditions pass through the drain F, connecting the inlet with the main sewer. The trap, gate, or valve G normally closes by its gravity on an outwardly-inclined seat, H, on which and on the faces of the trap suitable leather or other packing, I, will be placed, the packing on the inner face projecting beyond the edges thereof, to cause the trap to close and open with a gas-tight joint, and the trap is arranged so that its lower edge or end, when the trap is closed, projects sufficiently below the bottom of the basin-opening at $e$ to cause the trap to be always covered at the bottom to form a water-seal against gas escaping from the sewer, and being a sufficient distance above the bottom of the basin to afford below it a free passage of water from the inlet D to the drain F, as will be understood from Fig. 1 of the drawings.

Beyond the chamber D a man-hole, J, may be built directly above the basin E and opening into it, preferably outside of the trap G, to give access to the basin for any purpose—to readjust the trap, for instance—and the man-hole will have a suitable cover, $j$, as usual with openings of this kind. This man-hole will allow access to the basin for repairs. For cleaning out the basin I have provided an automatic flushing apparatus or device, consisting of a water-pipe, K, which communicates with a fresh-water main, L, and opens at $k$ at the outer end of the basin E, and whereby, when a valve, M, is opened by turning its stem $m$ by a wrench after removing a cap or cover, N, from the valve chamber or pocket O, the water will issue under full head through the pipe K to the basin and thoroughly and quickly wash therefrom into the drain F and the sewer any sedimentary or foul deposits which may have lodged therein, and leave the basin full of pure water, to form, with the trap G, an effective bar to the issue of gases from the sewer to the street.

The side edges of the trap G or its packing I fit closely to the side walls of the basin E, so that when the trap swings upward on its hinge $g$, when there is an unusual water inflow from the street-opening C, as in times of heavy rains or floods, the trap will still make an effective gas-seal at its sides as it is floated upward by the rising water in the basin, and the trap may swing upward, as indicated by the dotted line in Fig. 1 of the drawings, to allow the basin to open to its maximum capacity for carrying off the water from the chamber D to the pipe F, and thence to the sewer.

Having thus fully described my invention, I claim as new and desire to secure by Letters Patent—

1. In a sewer-inlet, the combination, with a basin, of a valve or gate hinged above the top of the outlet-opening of the basin to swing in the direction of the said outlet, and having its lower edge projecting down to within a short distance of the bottom of the basin and below the bottom of the said outlet, substantially as herein shown and described, whereby provision is made for the flow of the minimum quantity of water when the valve is closed and for the maximum quantity when it is opened, as set forth.

2. In a sewer-inlet, the shallow basin E, having its bottom formed with a straight portion from $a$ to $b$ and a curved portion from $b$ to $b'$, in combination with a gate or valve hinged above the top of the outlet-opening $e$, and projecting down to within a short distance from the bottom of the basin and below the bottom of the said outlet, substantially as herein shown and described.

3. In a sewer-inlet, the combination, with inlet-chamber and a basin at the lower part of the chamber and communicating with the sewer, of a rabbeted frame, H, a gate, G, hinged at its upper edge to swing in the direction of the outlet of the basin, and projecting down below the water-line of said basin, and a packing projecting from the sides of the gate, substantially as herein shown and described.

4. In a sewer-inlet, the combination, with an inlet-chamber and a basin connected to the lower end of said chamber, of a pipe connected with the outer end of the basin and curved to correspond to the surface of the bottom of the said basin for delivering water thereon, substantially as herein shown and described.

5. A sewer-inlet constructed with an opening, F, chamber D, basin E, drain F, trap G, a man-hole, J, and a flushing-pipe, K, connected to a water-main and provided with a valve, M, accessible for operation from the ground-surface, all arranged substantially as herein shown and described.

CHARLES PORTERFIELD KAHLER.

Witnesses:
   NEWTON M. GRAY,
   JOHN ELROLE.